H. A. STENNING.
BY-PASS VALVE AND CONTROLLING DEVICE FOR ENGINE CYLINDERS.
APPLICATION FILED FEB. 11, 1914.

1,179,468.

Patented Apr. 18, 1916.

WITNESSES
George Du Bon
Elmer Shirley young

INVENTOR
HARRY A. STENNING
BY
ATTORNEYS

UNITED STATES PATENT OFFICE.

HARRY ALEXANDER STENNING, OF LONDON, ENGLAND, ASSIGNOR TO SCHMIDT'SCHE HEISSDAMPF GESELLSCHAFT M. B. H., OF CASSEL-WILHELMSHÖHE, GERMANY, A CORPORATION OF GERMANY.

BY-PASS VALVE AND CONTROLLING DEVICE FOR ENGINE-CYLINDERS.

1,179,468.  Specification of Letters Patent.  Patented Apr. 18, 1916.

Application filed February 11, 1914. Serial No. 817,993.

*To all whom it may concern:*

Be it known that I, HARRY ALEXANDER STENNING, a subject of the King of Great Britain, and a resident of the city of London, England, have invented certain new and useful Improvements in a Combined By-Pass Valve and Controlling Device for Engine-Cylinders, of which the following is a specification.

My invention is particularly applicable in connection with locomotives where the cylinder ends, on each side of the piston, are joined by a pipe containing a by-pass valve, said valve being arranged so as to be either open or closed according to the working conditions. With the valve open any pressure differences tending to establish themselves on opposite sides of the piston immediately equalize.

My invention relates to a fluid operated controlling device for a by-pass valve placed in a connecting pipe as above set forth, the device being adapted to be moved in one direction by steam flowing from the steam chest or main steam pipe and in the other direction by steam supplied independently of the main steam pipe; such an independent connection is preferably by a pipe leading directly from the boiler.

My invention further relates to the combination of a controlling device, as just set forth, with a relief valve so arranged that when the by-pass valve opens, it, or the cylinder and connecting pipe which contains it, is placed in communication with the atmosphere.

My invention further relates to a fluid operated controlling device, of the character indicated, which is so connected with the saturated steam header of a superheater that the device simultaneously controls a flow of steam to the superheater in such a way that when the throttle is closed, there is a constant flow of steam through the superheater elements in which over-heating is thereby prevented.

It is the object of my invention to produce a controlled by-pass valve of the type indicated which shall reliably perform the various functions and purposes above set forth.

Other objects will appear as the specification proceeds.

My invention will be better understood by reference to the accompanying drawings, which set forth a preferred form thereof and form part of this specification.

Figure 1:
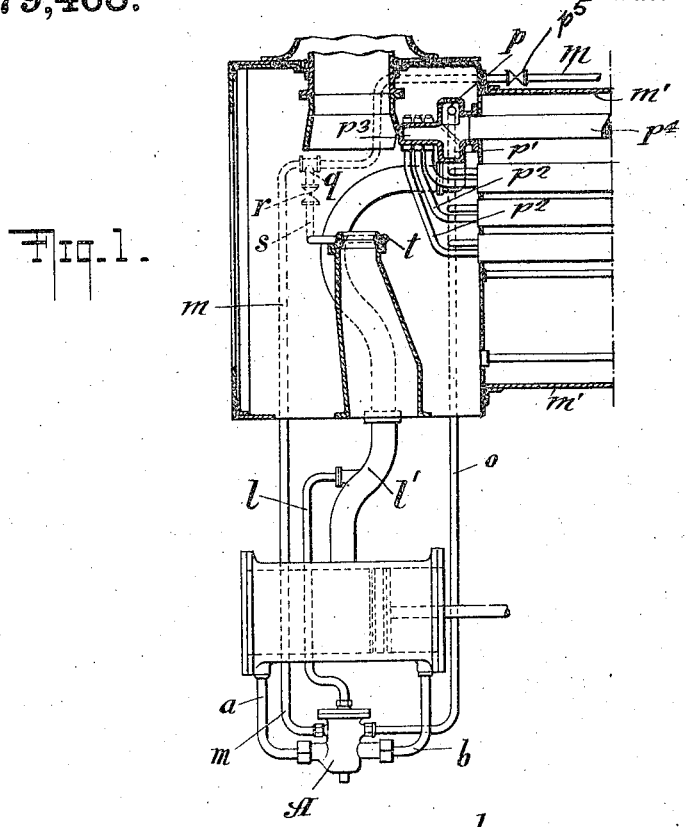
Figure 2:
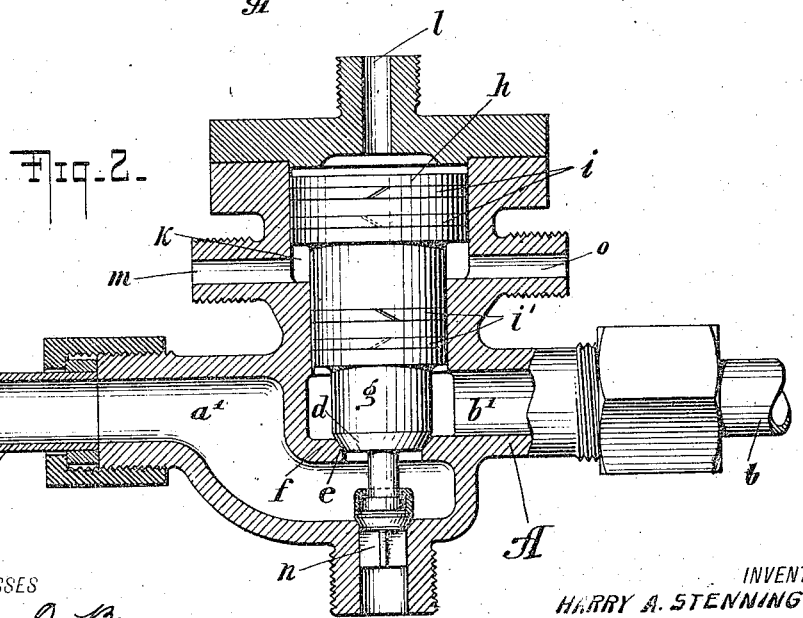

In the drawings Figure 1 represents a vertical longitudinal section through the front end of a locomotive boiler and smoke box, an engine cylinder being represented as connected therewith in usual relation and provided with my improved controlled by-pass valve, cylinder and valve being in elevation; Fig. 2 represents an enlarged central vertical section through the by-pass and controlling device.

In the drawings the controlled by-pass valve $A$ is provided with passages $a'$ and $b'$ joined respectively by pipes $a$ and $b$ to the two ends of the cylinder adjacent to the cylinder covers. The ends of these passages $a'$, $b'$ when they enter the valve are disposed one above the other, with a connecting passage adapted to be closed by the operation of a valve whose working face $d$ co-acts with a valve seat $e$ formed in the opening which connects said two passages $a'$, $b'$. The stem $g$ of this valve is cylindrical and enlarged at its upper end to constitute a piston $h$ provided with piston rings $i$; an intermediate part of the stem of the valve is also provided with piston rings $i'$.

The piston $h$ is slidable in a chamber $k$, the top of which, by a pipe connection $l$, communicates with the main steam pipe $l'$ leading to the engine cylinders and the bottom of chamber $k$ communicates independently, by a passage and steam pipe $m$, directly with the saturated steam supply at the steam dome (not shown) of the boiler $m'$, preferably through a boiler steam cock $p^5$.

The upper part of the smoke box is occupied by a superheater header, of any usual type for smoke tube superheaters, having a saturated steam chamber $p$ communicating directly with the steam dome through the main throttle (dome and throttle not shown) by the dry pipe $p^4$ and a superheated steam chamber $p'$ from which is taken the main steam supply pipe $l'$. The superheater elements $p^2$ are inserted in the flue tubes and their respective ends go to branch chambers $p^3$ which respectively and alternately open from the saturated and from the superheated chambers $p$ and $p'$.

The spindle $g$ is prolonged on the lower side of the valve face $d$ and carries, at its bottom, a loosely attached relief valve $n$ arranged to close an opening through the bottom of passage $a'$ to the external atmosphere; valve or face $d$ and relief valve $n$ open and close simultaneously. The use of the relief valve, while desirable, in many cases, is not essential.

The operation of my invention is as follows: When the main throttle is open so that steam is being admitted from dry pipe $p^4$ to and through the superheater header chambers $p$ and $p'$ and elements connecting said chambers, to the main steam pipe $l'$ and thence to the valve chest and engine cylinders, it is also necessarily admitted through the pipe connection $l$ so as to press against the upper side of the piston $h$. Steam will also be admitted (through cock $p^5$ if the same be opened) from the boiler to the underside of the piston through the pipe $m$ and will tend to press the piston $h$ upwardly. Since the effective pressure area on the lower side of piston $h$ is, however, less than that on the upper side of said piston, by an amount equal to the cross-sectional area of the valve spindle, the valve face $d$ is forced down upon its seat $e$ so that communication between the cylinder ends through the by-pass valve is cut off. If, however, the main throttle is closed, then the steam pressure through pipe $l$ on the upper side of the piston is cut off and steam entering to the piston from the pipe $m$ will force the piston upwardly so as to raise the valve face $d$ from its seat $e$ and thus provide communication between the cylinder ends through the by-pass valve so as to equalize the pressure on the two sides of the piston in the engine cylinder.

When the relief valve $n$ is provided this will, of course, be opened at the same time as is opened the passage between the engine cylinder ends so that each side of said cylinder will be connected with the atmosphere and the space therein, therefore, tend to be at atmospheric pressure.

Should there be any accumulation of water in the cylinders the pressure thereupon, exerted by the engine piston as it nears the end of its stroke, will act through the passages $a'$ and $b'$ so as to overcome the steam pressure on the upper side of piston $h$ and thus lift the relief valve and permit the water to escape.

The relief valve $n$ is shown as connected directly to the valve spindle; any other known arrangement for operatively joining said valve and valve spindle may be utilized instead. Similarly while I have shown the ends of passages $a'$, $b'$ disposed one above the other I may if I prefer arrange them in any other desired relative position, provided only they are adapted to be placed in communication with one another.

My improved controlling device and by-pass valve is particularly useful when used in conjunction with locomotives equipped with superheaters as by its use I may readily arrange for a small supply of steam to flow through the superheater elements when the main throttle is closed and the main steam supply to the engine cylinders thereby cut off; this small flow, passing from the saturated steam chamber of the header through all the superheating elements to the superheated steam chamber and therefrom to the main supply pipe, constantly supplies the superheater with fresh steam and aids in preventing overheating and consequent rapid burning out of the superheater parts. In this embodiment or use of my invention a passage and a pipe $o$ is disposed so as to lead from the chamber $k$, on the underside of piston $h$, to the saturated chamber $p$ of the superheater. In consequence, the steam supplied from the boiler cock $p^5$ through pipe $m$, passes through the chamber $k$ in the valve casing, thereby becoming effective to lift the piston $h$, and passes therefrom through passage and pipe $o$, saturated chamber $p$, superheater elements $p^2$, superheated steam chamber $p'$, main supply pipe $l'$ to the steam chest (not shown), thence by one of the steam induction ports of the cylinder (not shown), according to the position of the slide valve, into the cylinders and by the pipes $a$ and $b$ to the relief valve $n$ and to the atmosphere. Owing to the small quantity of steam which is allowed to pass under these circumstances it will be expanded in the superheater so as to be at a lower pressure than the saturated steam and will, therefore be unable to exert any effective pressure upon the upper area of piston $h$. Furthermore, owing to the small cross-section of pipe $l$ as compared with that of pipe $l'$ there will be but small tendency for steam to branch from pipe $l'$ through pipe $l$ to the upper area of piston $h$.

As just explained it is clear that when the main throttle is closed a small flow of steam takes place through the superheater elements, steam chest and cylinder. My invention, therefore, performs the function of a class of valves known as drifting valves, that is to say, valves which, when the main throttle is closed and the engine is coasting or drifting, permit a certain small supply of steam to flow through the engine cylinder to lubricate the same and to prevent the carbonization of oil therein. This drifting valve function is performed in addition to various other uses of the invention which have been described. When operating as a drifting valve the steam escapes to the atmosphere finally through relief valve n by way of passages a and b and also through the steam eduction passage (not shown) of the cylinder.

In my improved controlled by-pass, as described, it will be noted that when the main throttle is closed, the steam from the boiler cock $p^5$ through pipe m, acting below the piston h, keeps the valve d and relief valve n open positively so that the small supply of steam passing through the superheater elements cannot accumulate in the engine cylinders and thus possibly be the means of having the engine start off unexpectedly should the engine be standing still.

If desired, the steam passing through pipe m may be used to operate the blower by leading steam through a branch pipe g to the cock r and thence through pipe s to the blower t. This arrangement has the advantage that if the blower be started when the throttle is closed steam will also be passed through the superheater elements. If the cock of the blower should be opened by the engineer before the boiler cock is opened no steam will be supplied to the blower; the boiler cock must, hence, be opened first. This being done, steam from the boiler cock will start the blower and open the by-pass valve simultaneously so that steam will flow through the superheater elements so as to cool the same and prevent their overheating.

It should be understood that a controlled by-pass, as described, is provided for each cylinder they being so connected to the steam pipes as to operate simultaneously. The connection to the saturated chamber of the superheater need be made from but one of the devices.

The form of controlled by-pass described above is one that is preferred by me, but it is obvious that many details may be varied without departing from the spirit of my invention, which I desire to be defined by the following claims:

1. In an engine cylinder, a passage connecting the ends thereof, a valve controlling said passage, a relief valve adapted to open said passage to the atmosphere, and an automatically actuated differential piston mechanism for effecting the opening and closing of both of said valves.

2. In an engine cylinder, a passage connecting the ends thereof, a valve controlling said passage, a relief valve adapted to open said passage to the atmosphere, and an automatically actuated differential piston mechanism for effecting the simultaneous opening and closing of both of said valves.

3. In an engine cylinder, a passage connecting the ends thereof, a valve controlling said passage, a relief valve adapted to open said passage to the atmosphere, and a piston operatively connected with both of said valves for opening and closing them, said piston being provided with a pair of pressure areas which are open respectively to the aforesaid passage on opposite sides of the passage controlling valve.

4. In an engine cylinder, a passage connecting the ends thereof, a valve controlling said passage, a relief valve adapted to open said passage to the atmosphere, and a mechanism comprising a differential piston for actuating said two valves, one pressure area of said piston being connected with the main steam supply, a smaller pressure area having an independent steam supply, and said piston being further provided with a pair of pressure areas which are open respectively to the aforesaid passage on opposite sides of the passage controlling valve.

5. In an engine cylinder, a passage connecting the ends thereof, a valve controlling said passage, automatic means for opening said valve when the steam supply is cut off from the engine cylinder and automatic means for opening said passage to the atmosphere when water accumulates in said cylinder.

6. In combination with an engine cylinder, passages leading from the ends thereof, a valve casing with which the ends of said passages connect said ends being disposed one over the other and separated by a partition wall having an opening therethrough, an opening to the atmosphere through the wall of the lower passage said opening being in alinement with that of the partition wall, a piston in said valve casing said piston having an enlarged head and having also a pair of valve surfaces to engage the upper sides of said two openings and being further provided with pressure areas respectively connected with said two passages, a chamber at the top of said valve casing in which said head is adapted to slide, a passage connecting the top of said chamber to the main steam supply and a passage connecting the bottom of said chamber with an independent steam supply.

7. In an engine cylinder, a passage connecting the ends thereof, a valve controlling said passage, a relief valve adapted to open said passage to the atmosphere and a mechanism comprising a differential piston for opening and closing both of said valves, one of the pressure areas of said piston being arranged to receive steam from the main steam supply and another pressure area being arranged to receive steam pressure supplied from some independent point in the steam system.

8. In a locomotive provided with a superheater, in combination, an engine cylinder, a passage connecting the ends thereof, a valve controlling said passage, a relief valve adapted to open said passage to the atmosphere, a differential piston mechanism for simultaneously actuating both of said valves, a passage for leading steam from the main steam supply to one of the piston areas, and an independent passage between the boiler and the saturated ends of the superheater elements, said passage opening to another of the piston areas.

In testimony whereof I have hereunto set my hand in the presence of two subscribing witnesses.

HARRY ALEXANDER STENNING.

Witnesses:
WILLIAM ARTHUR CULLEN,
THOMAS HENRY GOLDSHEAF.